(12) United States Patent
Lee (10) Patent No.: US 8,228,647 B2
(45) Date of Patent: Jul. 24, 2012

(54) ELECTRICAL POWER DIAGNOSTIC SYSTEM

(76) Inventor: Wy Peron Lee, Riverside, CA (US)

( * ) Notice: Subject to any disclaimer, the term of this patent is extended or adjusted under 35 U.S.C. 154(b) by 434 days.

(21) Appl. No.: 12/313,208

(22) Filed: Nov. 17, 2008

(65) Prior Publication Data

US 2010/0123980 A1 May 20, 2010

(51) Int. Cl.
*H02H 7/00* (2006.01)

(52) U.S. Cl. ........... 361/23; 361/1; 361/5; 361/6; 361/7; 361/18; 361/30; 361/31; 323/274; 323/275; 323/246; 323/285; 323/276; 318/432; 318/434; 318/433; 340/1.1; 340/16.1; 83/76.7; 83/76.8; 83/76.1

(58) Field of Classification Search ................... 700/180, 700/83, 17, 11, 1, 79, 117, 170, 171; 340/1.1–16.1; 83/76.7, 76.8, 76.1; 710/64, 62; 318/432, 318/433, 434; 323/274, 275, 246, 285, 276; 361/1, 5–7, 18, 30, 31
See application file for complete search history.

(56) References Cited

U.S. PATENT DOCUMENTS

| | | | | |
|---|---|---|---|---|
| 4,463,242 A * | 7/1984 | Schlienger et al. | ........... | 219/69.2 |
| 4,510,368 A * | 4/1985 | Schlienger et al. | ........ | 219/69.17 |
| 4,524,812 A * | 6/1985 | Murphy | ...................... | 144/135.2 |
| 4,641,557 A * | 2/1987 | Steiner et al. | ................. | 83/76.7 |
| 4,866,630 A * | 9/1989 | Beaman et al. | ............... | 700/160 |
| 5,038,473 A * | 8/1991 | Bradley | ............................ | 30/92 |
| 5,251,142 A * | 10/1993 | Cramer | ......................... | 700/171 |
| 5,418,729 A * | 5/1995 | Holmes et al. | ................. | 700/167 |
| 5,619,734 A * | 4/1997 | Yabusaki | ........................ | 710/62 |
| 6,479,958 B1 * | 11/2002 | Thompson et al. | ........... | 318/430 |
| 6,898,478 B2 * | 5/2005 | Dick et al. | .................... | 700/171 |
| 7,031,789 B1 * | 4/2006 | Dick et al. | ..................... | 700/117 |
| 7,080,431 B2 * | 7/2006 | Sawyer et al. | ................. | 29/26 A |
| 7,116,071 B2 * | 10/2006 | Glasgow et al. | .............. | 318/280 |
| 7,171,738 B2 * | 2/2007 | Dick et al. | ...................... | 29/563 |
| 7,178,436 B2 * | 2/2007 | Wilson | ............................ | 83/62.1 |
| 7,232,361 B1 * | 6/2007 | Triplett et al. | .................... | 451/5 |
| 7,282,880 B2 * | 10/2007 | Glasgow et al. | .............. | 318/280 |
| 7,420,341 B2 * | 9/2008 | Glasgow et al. | .............. | 318/280 |
| 7,481,140 B2 * | 1/2009 | Gass et al. | ......................... | 83/76 |
| 7,493,700 B2 * | 2/2009 | Isele et al. | ........................ | 33/286 |
| 7,511,443 B2 * | 3/2009 | Townsend et al. | .......... | 318/568.2 |
| 7,614,433 B2 * | 11/2009 | Arasmith | ....................... | 144/394 |
| 7,779,737 B2 * | 8/2010 | Newman et al. | ................ | 83/485 |
| 7,791,297 B2 * | 9/2010 | Mueller et al. | ................. | 318/434 |
| 7,792,602 B2 * | 9/2010 | Dick | .............................. | 700/180 |
| 7,835,808 B2 * | 11/2010 | Sawyer et al. | ................... | 700/84 |
| 7,849,774 B2 * | 12/2010 | Oberheim | ..................... | 83/471.3 |
| 2006/0247795 A1 * | 11/2006 | Gass et al. | ......................... | 700/1 |
| 2008/0245200 A1 * | 10/2008 | Campbell | ......................... | 83/13 |

* cited by examiner

*Primary Examiner* — Rita Leykin (74) *Attorney, Agent, or Firm* — Raymond Y. Chan; David and Raymond (57) ABSTRACT

An electrical power diagnostic system includes a system housing, a power saw management system, and a user interface. The system housing is electrically connected with the power unit of the power saw, wherein the system housing includes a control panel provided thereon for allowing a user to adjust an operational parameter through the control panel. The power saw management system includes a control processor mounted within the system housing to electrically communicate with the power saw, wherein the control processor is pre-programmed to manage operational parameters of the power saw and supervise actual operation of the power saw machine and the saw blade in such a manner that when abnormal operating condition of the power saw machine is detected, the control processor is adapted to selectively adjust the operational parameters of the power saw machine for stopping the abnormal operating condition from continuously happening.

18 Claims, 6 Drawing Sheets

ELECTRICAL POWER DIAGNOSTIC SYSTEM

BACKGROUND OF THE PRESENT INVENTION

1. Field of Invention

The present invention relates to a power saw machine, and more particularly to an electrical power diagnostic system for a power saw machine which is capable of managing and monitoring the major operational parameters of the power saw machine so as to allow a user of the present invention to optimally adjust the performance of the power saw machine so as to maximize the quality of the resulting product.

2. Description of Related Arts

A conventional power saw machine usually comprises a work table for a work piece disposed thereon, a saw blade suspendedly supported above the work table, and a power unit coupled with the saw blade for driving the saw blade to rotate at an extremely high speed for cutting the work piece on the work table. During a typical cutting process, the operator of the power saw machine has to manually control and monitor all the operational parameters thereof so as to obtain a satisfactory cut on the work piece. For example, the operator has to monitor the rotation status of the saw blade, switch the on/off of the cooling fluid, control the speed at which the work piece moves with respective to the saw blade in order to successfully perform a regular cutting operation.

There exists a number of disadvantages regarding the above mentioned conventional power saw machine. First, it is obvious that the above mentioned parameters are controlled by different mechanical devices which may or may not be directly associated with the mechanical hardware of the power saw machine. For example, the cooling fluid may be controlled by a pump not connected with the power saw machine itself. Moreover, the power supplied to the power unit may be controlled through a control panel of the power saw machine. Thus, the user has to simultaneously control many operational parameters for each single cutting process. All these components, especially electrical components, are separated from each other, can not be centrally controlled. This is troublesome, inconvenient, and easy to cause industrial accidents.

Second, the conventional power saw machine does not have the function to do self examine. For example, if the power supply system is not properly connected, it will cause accident during operation, such as fire caused by over loaded wire. If the saw blade is loosely installed onto the power unit, the saw blade cannot be operated to cut the work piece. However, the power saw machine does not provide any self-detecting device to monitor such problem.

Third, the conventional power saw machine does not allow the user to monitor such operational parameters as machine loading and to provide warning as to the occurrence of any abnormal cutting conditions. For example, if the machine loading becomes too high, (i.e. above the manufacturer recommended level), the power unit may experience burning. Even if the machine loading is below the threshold level, when the power unit is working at such condition for an extended period of time, the product life span of the entire power saw machine may substantially shorten. Thus, suitable warnings must be generated to alert the user of the power saw machine. Therefore, the electrical condition should be examined before power on the saw machine.

SUMMARY OF THE PRESENT INVENTION

A main object of the present invention is to provide an electrical power diagnostic system for a power saw machine which is capable of managing and monitoring the major operational parameters of the power saw machine so as to allow a user of the present invention to optimally control the power saw machine to maximize the quality of the resulting product.

Another object of the present invention is to provide an electrical power diagnostic system for a power saw machine which is capable of detecting a wide range of abnormal cutting condition for the power saw machine so as to avoid potential industrial accidents on the part of the user of the present invention. In other words, the electrical power diagnostic system will detect the electrical problem of the power saw machine and notify the user how to repair the component of the power saw machine if malfunction occurs.

Another object of the present invention is to provide an electrical power diagnostic system for a power saw machine which comprises a power saw management system and an interactive user interface provided on a system housing and electrically connected with the power saw management system for promptly and accurately communicating information from the power saw management system to a user of the power saw machine. Accordingly, the power saw management can detect the voltage drop in power source.

Another object of the present invention is to provide an electrical power diagnostic system which is easy and convenient to use and support a wide variety of power saw machines so as to facilitate widespread application of the present invention. Accordingly, the electrical power diagnostic system can incorporate with the power saw machine or hand saw to efficiently cut the work piece such as tile and masonry.

Accordingly, in order to accomplish the above objects, the present invention provides an electrical power diagnostic system for a power saw machine having a saw blade driven by a power unit, comprising:

a system housing electrically connected with the power unit of the power saw, wherein the system housing comprises a control panel provided thereon for allowing a user to monitor an operational parameter through the control panel;

a power saw management system comprising a control processor mounted within the system housing to electrically communicate with the power saw, wherein the control processor is pre-programmed to manage the operational parameters of the power saw and supervise actual operation of the power saw machine and the saw blade in such a manner that when abnormal operating condition of the power saw machine is detected, the control processor is adapted to selectively notify the operational parameters of the power saw machine for stopping the abnormal operating condition from continuously happening in order to ensure operation effectiveness and efficiency of the power saw machine while maintaining the maximum safety standard thereof; and a user interface provided on the system housing and electrically connected with the power saw management system for promptly and accurately communicating information from the power saw management system to a user of the power saw machine.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1, FIG. 2A to FIG. 2C, and FIG. 3 of the drawings, an electrical power diagnostic system for a power saw machine 70 having a saw blade 71 driven by a power unit 72 according to a preferred embodiment of the present invention is illustrated, in which the electrical power diagnostic system comprises a system housing 10, a power saw management system 20, and a user interface 30.

The system housing 10 is electrically connected with the power unit 72 of the power saw machine 70, wherein the system housing 10 comprises a control panel 11 provided thereon for allowing a user to monitor an operational parameter through the control panel 11.

The power saw management system 20 comprises a control processor 21 mounted within the system housing 10 to electrically communicate with the power saw machine 70, wherein the control processor 21 is pre-programmed to manage the operational parameters of the power saw machine 70 and supervise actual operation of the power saw machine 70 and the saw blade 71 in such a manner that when abnormal operating condition of the power saw machine 70 is detected, the control processor 21 is adapted to alert the user and selectively notify the operational parameters of the power saw machine 70 for stopping the abnormal operating condition from continuously happening in order to ensure operation effectiveness and efficiency of the power saw machine 70 while maintaining the maximum safety standard thereof.

On the other hand, the user interface 30 is provided on the system housing 10 and electrically connected with the power saw management system 20 for promptly and accurately communicating information from the power saw management system 20 to a user of the power saw machine 70.

According to the preferred embodiment of the present invention, the system housing 10 is electrically connected with the power saw machine 70, wherein the control processor 21 has a plurality of one or more control terminals 215 to electrically couple with one or more accessory devices, such as a fluid pump or a light, for comprehensively manage and supervise the every single cutting operation.

Figure 1:
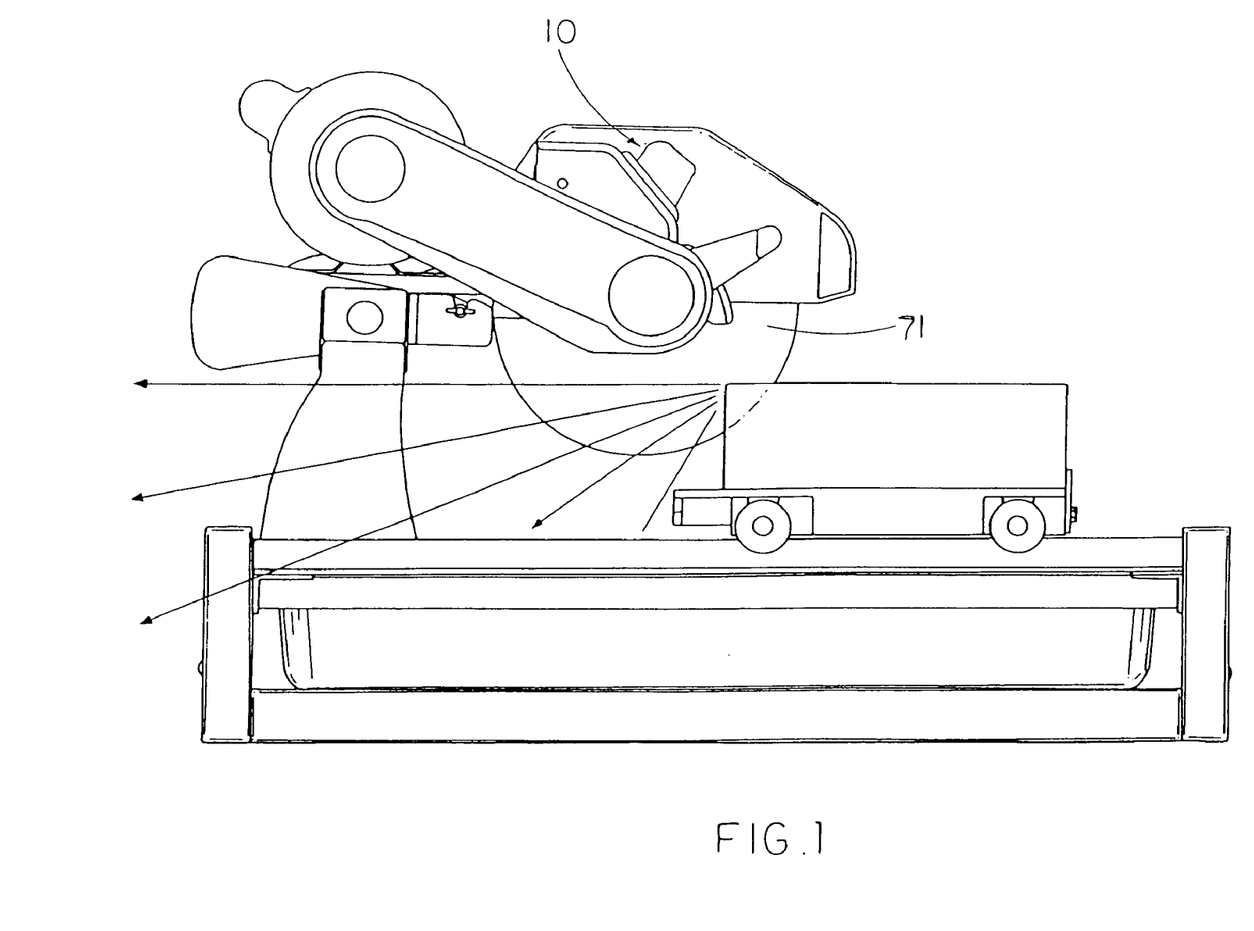
FIG. 1 is a schematic diagram of the electrical power diagnostic system according to the above preferred embodiment of the present invention.
Figure 2A:
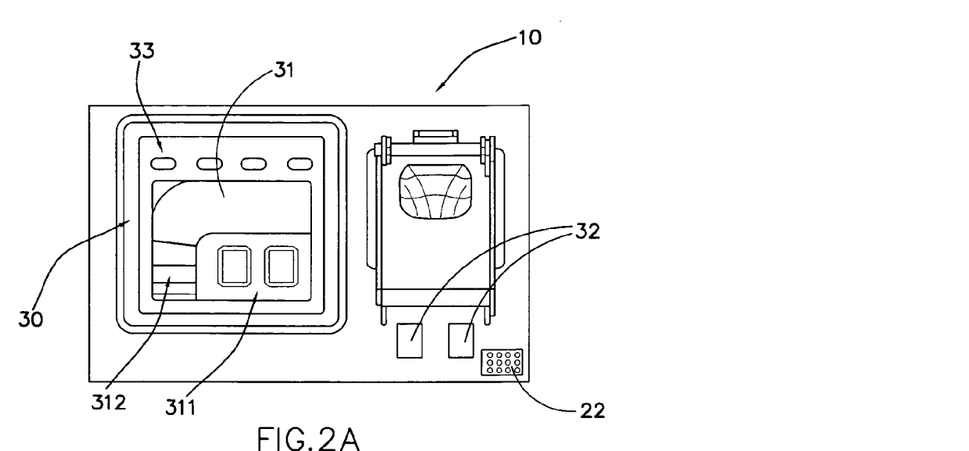
FIG. 2A to FIG. 2C are three other schematic diagrams of the electrical power diagnostic system according to the above preferred embodiment of the present invention.
Figure 2B:
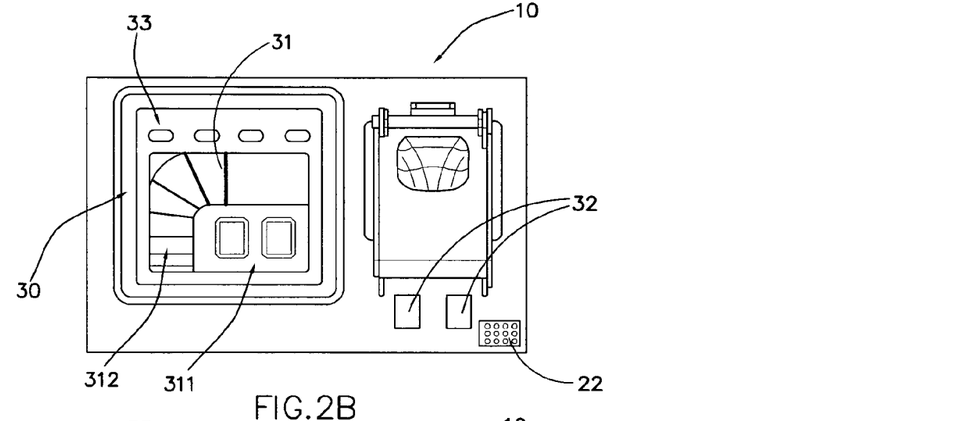
Figure 2C:
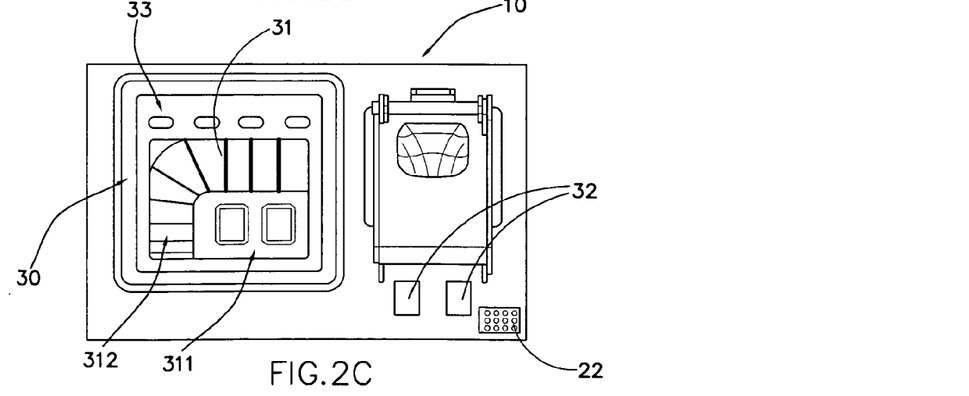
Figure 3:
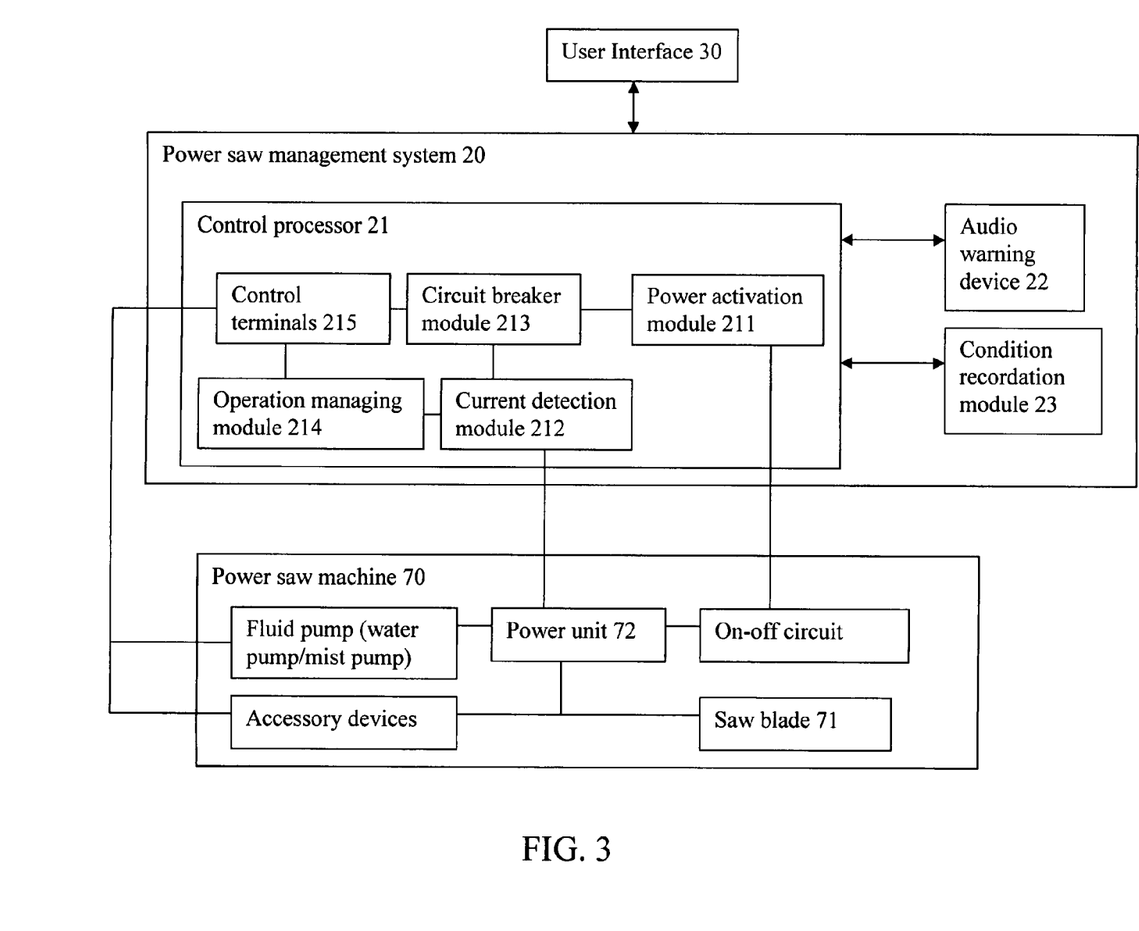
FIG. 3 is a block diagram of the electrical power diagnostic system according to the above preferred embodiment of the present invention.

The control processor 21 comprise a power activation module 211 electrically communicated with the on/off circuit of the power saw machine 70 for shutting off the power saw machine 70. Preferably, the power activation module 211 is electrically communicated with the on/off circuit of the power saw machine 70 and the accessory device for selectively activating and deactivating the power saw machine 70 and the corresponding accessory device. Where there exists more than one accessory device, the power activation module 21 is capable of selectively and individually controlling the activation or deactivation of the accessory devices. In other words, a user is able to control the on/off state of the power saw machine 70 and the accessory devices simply through controlling the control panel 11 of the system housing 10 via the user interface 30.

Accordingly, the user interface 30 comprises a display screen 31 provided on the system housing 10 and electrically connected with the control processor 21 for promptly and accurately displaying the operation of the power saw machine 70 and the accessory devices in a real time basis. As shown in FIG. 3 of the drawings, the display screen 31 has a digit indicating section 311 for indicating a proper condition of the power saw machine 70. When the power saw management system 20 detects that the power saw machine 70 has improper working condition, two letters or digitals will flash at the digit indicating section 311, whereas when the power saw machine 70 is working properly, the number "0" will be shown in the digit indicating section 311. The user interface 30 further comprises a plurality of functional buttons 32 on the system housing 10 for user preference setting.

Moreover, the control processor 21 further comprises an operation managing module 214 electrically connected with the power saw machine 70 to preliminarily inspect and detect any possible error on basic operational parameters in a real-time manner. Accordingly, the operation managing module 214 will become active once the power saw machine 70 is plugged into a power source, wherein the power saw machine 70 does not have to be turned on. The operation managing module 214 will automatically go into a standby mode after a self system diagnostic is performed and completed.

For example, the operation managing module 214 is pre-programmed to analyze the basic operation features of the cutting task (such as the materials of the work piece, the desired feed rate or the desired cutting path etc.) inputted by the user and determines if the actual hardware components of the power saw machine 70 is compatible with the basic operation features as inputted by the user. For example, the cutting procedure may require the use of a particular blade type of the saw blade 71 but the actual saw blade 71 installed onto the power unit 72 is not the same as the desired type of the saw blade 71. Then, a warning signal will be generated and displayed onto the display screen 31, which further has a warning section 313 for displaying such a warning generated by the operation managing module 214. Other possible improper basic operation features include incorrect extension cable gauge and power supply voltage.

The power saw management system 20 further comprises an audio warning device 22 provided on the system housing 10 to electrically connect with the control processor 21 for generating audio warning signals when necessary (i.e. when improper working condition of the power saw machine 70 is detected and user attention is urgently needed). It is worth mentioning that the operation managing module 214 will also inspect the other basic operation features of the power saw machine 70 when it has first been initialized.

The control processor 21 further comprises a current detection module 212 electrically connected with the power saw machine 70 for detecting the electrical current drawn by the power unit 72 of the power saw machine 70. The detected current will be shown on the display screen 31 of the user interface 30. Accordingly, the display screen 31 further has a current indicator region 312 formed thereon for displaying the current drawn by the power unit 72. The current indicator region 312 preferably contains a plurality of current sections, namely a low current section (designed to be 0 A-8 A), an optimal current section (designed to be 7 A-15 A), a high current section (designed to be 15 A to a threshold break current, which is designed to be 20 A) for indicating the real-time current drawn by the power saw machine 70. For example, when the power unit 72 is drawing 10 A current, corresponding illumination will be generated on the display screen 31 at the optimal current section so as to indicate to the user is the present invention that the power saw machine 70 is drawing a proper level of current. However, if the power saw machine 70 is drawing a current of 18 A, corresponding illumination will be generated on the display screen 31 at the high current section of the current indicator region 312. It is worth mentioning that at this point, even though the power saw machine 70 can still handle this load, the user of the present invention should reduce the current drawn by reducing the loading of the power saw machine 70 (such as by reducing a cutting feed rate of the work piece). Moreover, a visual warning (or audio) signal (in the form of illumination) will also be generated at the warning section 313 of the display screen 31.

In order to prevent the power saw machine 70 from drawing too much current so as to create danger to the cutting operation, the control processor 21 further comprises a circuit breaker module 213 electrically connected with the power saw machine 70 in such a manner that when the threshold break current as detected by the current detection module 212 has been reached for a predetermined period of time, such as 3 to 5 seconds, the circuit breaker module 213 is activated to turn off the power saw machine 70 so as to avoid any accident which may have occurred due to overload of the power saw machine 70. At this point, the user must inspect the reason of the overloading and take the necessary remedial action to the power saw machine 70. For example, the user may replace the saw blade 71 or dress any diamond rim of that saw blade 71.

The power saw management system 20 further comprises a condition recordation module 23 communicatively linked to the control processor 21 for recording an operation condition of the power saw machine 70. Accordingly, the condition recordation module 23 will keep recording the current condition of the power saw machine 70 including the statuses of the accessory devices and the current detected from the current detection module 212. The condition recordation module 23 contains data to explain the reason the power saw machine 70 failed, the resulting diagnosis, and the actions taken by the system of the present invention. For example, when the power of the power saw machine 70 is deactivated by the power activation module 211 due to the failure operation of the fluid pump, the condition recordation module 23 will record and show the reason of the failure operation of the power saw machine 70. Therefore, the user is able to trace the problem of the power saw machine 70 through the condition recordation module 23. In addition, the records in the condition recordation module 23 will diagnose whether the power saw machine 70 is being misused, such as using a wrong saw blade 71, or not.

It is worth mentioning that the electrical power diagnostic system of the present invention can be an external diagnostic device as an add-on device to electrically couple between the power source and the power saw machine 70. As an add-on device, the user may still operate the power saw machine 70 even if the electrical power diagnostic system of the present invention fails. The electrical power diagnostic system can also be formed as an internal diagnostic device that the electrical power diagnostic system is built-in with the power saw machine 70.

For a preferred embodiment of the present invention, the electrical power diagnostic system is operating in the following procedure.

(1) The electrical power diagnostic system becomes standby once the power saw machine 70 is connected with the power supply (power line). The electrical power diagnostic system is activated at the stand-by mode by plugging the power saw machine 70 into the power supply of the wall socket. Accordingly, the electrical power diagnostic system will run passively that if the electrical power diagnostic system fails to operate, the power saw machine 70 will continue to function. The electrical power diagnostic system will automatically enter into standby mode after a self system diagnosis is performed and completed. Accordingly, the entire LED board will blink three times for user to check the status of its LED's and then the digital display will show the current detected voltage. In other words, the power saw machine 70 will operate with or without the electrical power diagnostic system. In case of the failure of the electrical power diagnostic system, the user is able to re-wire the wiring structure of the electrical power diagnostic system to by pass the electrical power diagnostic system so as to ensure the power saw machine 70 being operated normally.

a. The electrical power diagnostic system performs self diagnosis of the PCB of the power saw machine 70. If the PCB is ok, the LED of the digital indicating section 311 will be off. If the self diagnosis of the PCB is failed, the LED of the digital indicating section 311 will blink.

b. The electrical power diagnostic system measures voltage level of the power line. If the voltage is too high, the LED of the digital indicating section 311 will display the voltage level and blink until the problem is fixed. If the voltage drop is too high (voltage is too low), the LED of the digital indicating section 311 will display the voltage level and blink until the problem is fixed. If the voltage level is acceptable, the LED of the digital indicating section 311 will display the voltage level for 3 seconds after being plugged in.

c. The electrical power diagnostic system also has an onboard timer that when used with the LED of the digital indicating section 311 can notify the user if the correct blade is used depending on blade performance. The user needs to select the length of the work piece before the power saw machine 70 is turned on. This function is optional.

Accordingly, the user must select what length tile the user is cutting. This setting must be set before the power saw machine 70 is turned on. The actuation of the switch will prompt a tile length value to appear on the LED digital display. Unit display will be inches. The user must actuate the left button 32 repetitively until the correct length appears. The left button 32 needs to be held down to change the length value displayed on the LED digital display.

Note that this function is optional. The power saw machine will operate fine without this function. To turn this feature off continue actuate the left button 32 repetitively until the LED digital display reads OFF. The left button 32 needs to be held down until the LED digital display read OFF.

(2) Turn on the system using the on-off switch of the electrical power diagnostic system. PWR, PMP (if pump is on manual mode) and RDT LEDs will turn on except the work light.

a. The electrical power diagnostic system will detect electricity flow interruption including power switch failure and reset button (circuit breaker) failure if the power saw machine is not activated when it is turned on. Accordingly, power switch failure will cause the power switch LED to not activate (note none of the status LED's 33 will light until the switch is replaced). Reset button (circuit breaker) failure will cause the reset LED to flash. If the circuit breaker needs to be reset, LED will also flash.

b. The digital indicating section 311 (as the LED digital meter) displays the current amperage being used, or an error code. The codes can be displayed either when the power saw machine 70 is powered on or just plugged in.

c. The low current section is lighted to illustrate low power draw. Accordingly, the ammeter will light the yellow bar first to illustrate low power draw. Increase power draw will cause more bars to become lit.

(3) Use the electrical power diagnostic system to help the operation of the power saw machine 70 for the user.

a. Active the work light located under the cutting head. Accordingly, the actuation (depression) of the right button 32 will activate the work light located under the cutting head. This light can either be AC/DC powered. If the LED for light turns on and the actual work light does not activate, the light needs to be changed.

b. Change the water pump 73/mist pressure pump 74 usage setting. Accordingly, holding down the left button 32 for a few seconds and then letting go will cause the electrical power diagnostic system to change the water pump/mist pump usage setting. The LED digital display will notify the user when the setting has changed the button 32 can be released. There are two modes of use. The pump can be set to manual on or semi-auto. This step must be repeated until the user has activated the desire setting.

Manual mode means as soon as the power saw machine is powered on via on-off switch, the water pump/mist pump will be activated. Pump can be forced on/off by quickly depressing the left button 32.

Semi-auto mode means as soon as the power saw machine is on, the pump will be on stand-by mode. As soon as the user starts cutting, the pump will immediately turn on. When no load is detected, the pump will run for three more seconds before shutting off. User can force the pump on by quickly depressing the left button 32. Pump will deactivate as usual in three seconds if no load is detected.

Keep in mind if the LED for the pump turns on (found next to the switch, reset and light LED) but the pump does not turn on, then the pump needs to be changed.

c. If the onboard timer is used, the user must always cut at an acceptable amp load. The user must always cut at an acceptable amp load, which is shown on the ammeter display. Reason for this is that the electrical power diagnostic system will record the timed cut based on the fact that the user is pushing the power machine 70 to cut at the set load. If the user is allowing too much slack then of course the cuts will take longer to finish.

At the end of the cut when the power saw machine is on and the user depresses the left button 32 for less than three seconds. The digital display will read BLD. Concurrently a single colored section will flash illustrating the blade quality rating. The quality of the cutting will be illustrated by the warning section 313 representing fair, excellent, and poor respectively. Accordingly, yellow color at the warning section 313 represents fair, green color at the warning section 313 represents excellent and red color at the warning section 313 represents poor.

d. The electrical power diagnostic system stores the information during operation, especially for rental or maintenance use. The information comprises (i) Number of house used; (ii) Number of times the users overload the saw; (iii) Number of times the user operated the saw at an incorrect voltage and what the voltage value was, (iv) What is the average amperage the saw was operated at, etc. . . .

It is worth mentioning that if the electrical power diagnostic system is connected to a gas engine of the power saw machine, the engine must be turned on before the electrical power diagnostic system goes into stand-by mode. Also, when in this arrangement, the electrical power diagnostic system will only be able to manage the water pump/mist pump. There will be no circuit breaker to monitor.

Accordingly, the conventional power saw machine using the gas engine can only mechanical pump. When the electrical power diagnostic system is incorporated with the power saw machine, the mist pump can be used for the gas engine type power saw machine. The electrical power diagnostic system will manage the water pump/mist pump to reduce the pollution of spitting out of the residual particles during cutting operation.

Figure 4:
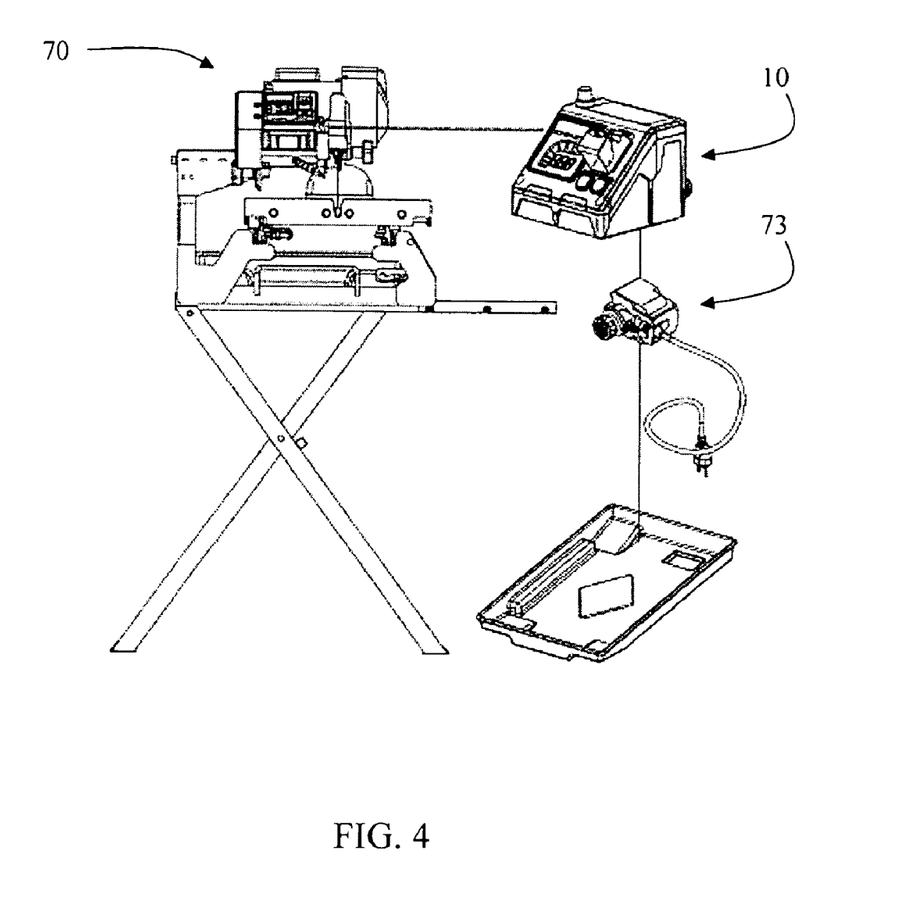
FIG. 4 illustrates the electrical power diagnostic system incorporating with an electric wet tile saw with a water pump according to the above preferred embodiment of the present invention.
Figure 5:
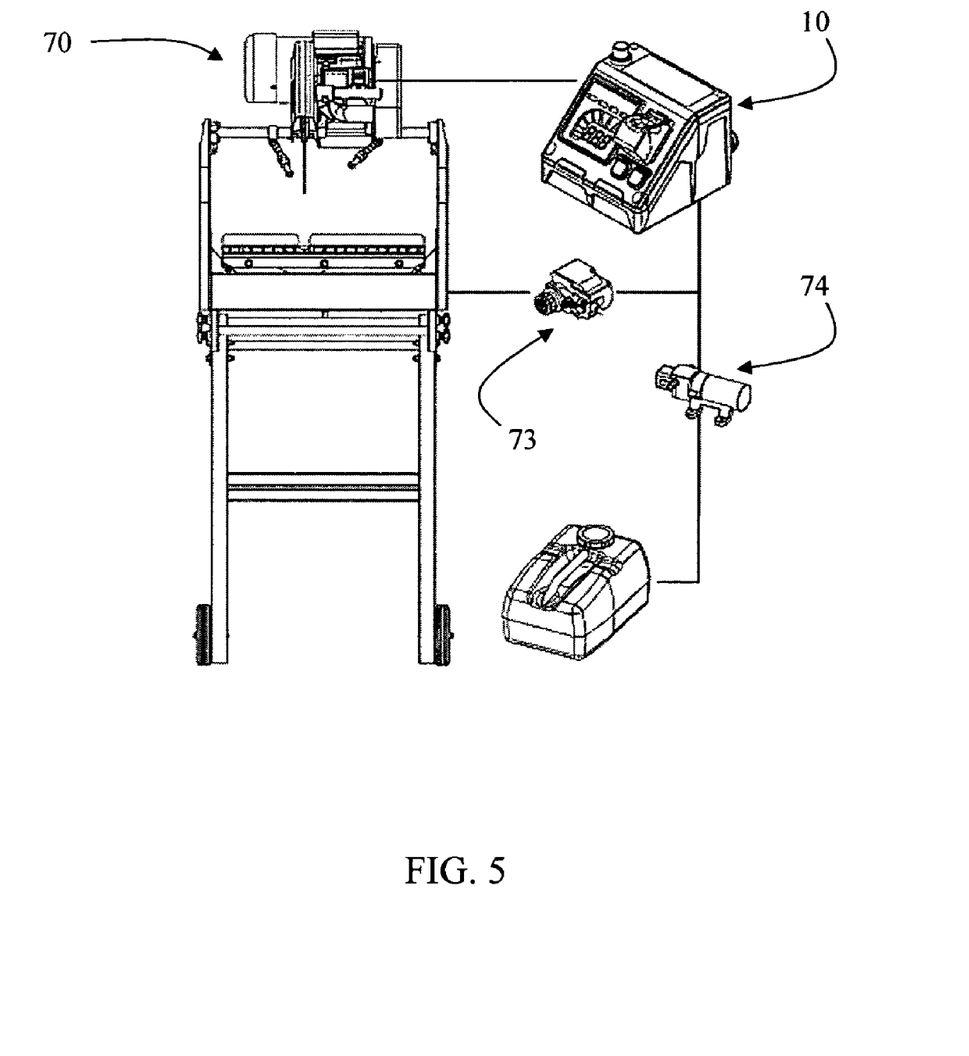
FIG. 5 illustrates the electrical power diagnostic system incorporating with an electric masonry saw with a water pump or mist pressure pump according to the above preferred embodiment of the present invention.
Figure 6:
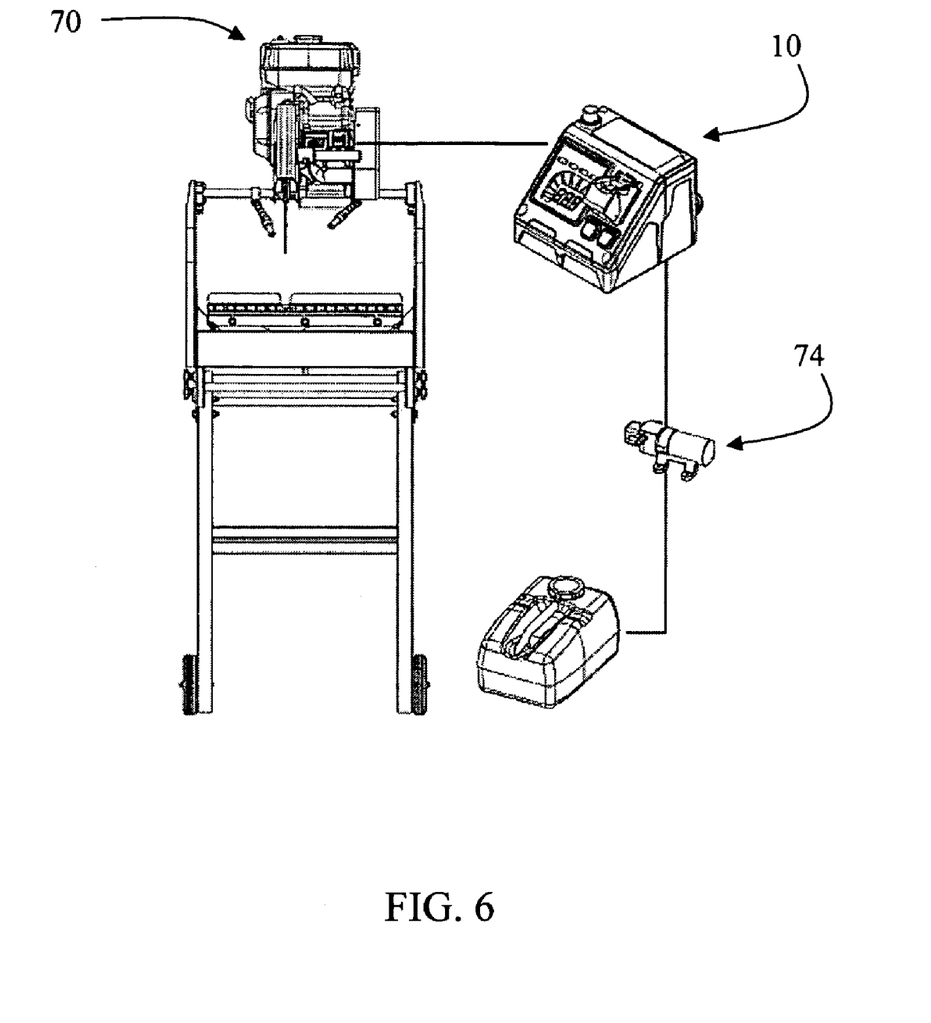
FIG. 6 illustrates the electrical power diagnostic system incorporating with a gas engine masonry saw with a mist pressure pump according to the above preferred embodiment of the present invention.

As shown in FIGS. 4 to 6, the electrical power diagnostic system can be incorporated with different types of power saw machine 70 with different type of pumps. As shown in FIG. 4, the electrical power diagnostic system can be incorporated with an electric wet tile saw with the water pump 73. As shown in FIG. 5, the electrical power diagnostic system can be incorporated with an electric masonry saw with the water pump 73 or the mist pressure pump 74. As shown in FIG. 6, the electrical power diagnostic system can be incorporated with a gas engine masonry saw with the mist pressure pump 74.

It is appreciated that the electrical power diagnostic system is adapted not only to monitor the operational parameters of the power saw machine 70 but also to controllably adjust the operational parameters of the power saw machine 70 via the control panel 11. Accordingly, the control processor 21 can manage the operational parameters of the power saw machine 70 and supervise the actual operation of the power saw machine 70 and the saw blade 71 in such a manner that when the abnormal operating condition of the power saw machine 70 is detected, the control processor 21 is adapted to selectively adjust the operational parameters of the power saw machine 70 for stopping the abnormal operating condition from continuously happening in order to ensure operation effectiveness and efficiency of the power saw machine 70 while maintaining the maximum safety standard thereof.

It is appreciated that the light can be electrically connected with the electrical power diagnostic system as one of the accessory devices of the power saw machine 70 such that the electrical power diagnostic system can control the on-and-off operation of the light and monitor the operation of the light regardless if the power saw machine 70 is on or off. In other words, the diagnosing method of the pump of the power saw machine 70 can be applied to the diagnosing method of the light.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of diagnosing a power saw machine via an electrical power diagnostic system, comprising the steps of:

(a) activating said electrical power diagnostic system at a stand-by mode when said power saw machine is electrically connected to a power line, wherein at said stand-by mode, said electrical power diagnostic system performs a self diagnose and measures voltage level of said power line;

(b) switching on said power saw machine through said electrical power diagnostic system to manage operational parameters of said power saw machine and supervise actual operation of said power saw machine and a saw blade thereof in such a manner that when abnormal operating condition of said power saw machine is detected, said electrical power diagnostic system is adapted to selectively notify said operational parameters of said power saw machine for stopping said abnormal operating condition from continuously happening in order to ensure operation effectiveness and efficiency of said power saw machine while maintaining the maximum safety standard thereof; and (c) activating a pump of said power saw machine through said electrical power diagnostic system, wherein said pump is selectively activated between a manual mode and a semi-auto mode, wherein at said manual mode, said pump is automatically activated once said power saw machine is powered on through said electrical power diagnostic system, wherein at said semi-auto mode, said pump is set at stand-by once said power saw machine is powered on through said electrical power diagnostic system such that said pump is automatically operated during cutting operation of said power saw machine, wherein when no load is detected, said pump is running for a predetermined time period before shutting off.

2. The method, as recited in claim 1, further comprising a step of recording an operation condition of said power saw machine.

3. The method, as recited in claim 1, wherein the step (a) further comprises a step of monitoring a blade performance by selectively inputting a length tile of a work piece to be cut so as to ensure a corrected saw blade being used.

4. The method, as recited in claim 2, wherein the step (a) further comprises a step of monitoring a blade performance by selectively inputting a length tile of a work piece to be cut so as to ensure a corrected saw blade being used.

5. An electrical power diagnostic system for a power saw machine having a saw blade driven by a power unit, comprising:

a power saw management system, which is arranged for detecting an abnormal operating condition of said power saw machine, comprising a control processor for electrically communicating with said power saw machine to manage operational parameters of said power saw machine and to supervise actual operation of said power saw machine, wherein said control processor comprises a current detection module for detecting an electrical current drawn by said power unit in a real time manner in responsive to a load of said saw blade during cutting operation, wherein said current is detected by said current detection module among a low current range for indicating an under load of said saw blade, an optimal current range for indicating an optimal load of said saw blade, and a high current range for indicating an over load of said saw blade, wherein when said current detection module detects said power saw machine at said low current range or at said high current range, said control processor is adapted to selectively notify said operational parameters of said power saw machine for stopping said abnormal operating condition from continuously happening in order to ensure operation effectiveness and efficiency of said power saw machine while maintaining the maximum safety standard thereof; and a user interface electrically connected with said power saw management system for promptly and accurately communicating information from said power saw management system to a user of said power saw machine;

wherein said control processor further comprises an operation managing module being initially activated at a stand-by mode before said power saw machine is turned on and is electrically connected to a power line for performing a self diagnose and measure voltage level of said power line.

6. The electrical power diagnostic system, as recited in claim 5, wherein said control processor further comprises a circuit breaker module for electrically connecting to said power saw machine, wherein when said current detected by said current detection module reaches a threshold break current for a predetermined period of time, said circuit breaker module is activated for turning off said power saw machine so as to avoid potential accident which may occur due to overloading of said power saw machine.

7. The electrical power diagnostic system, as recited in claim 5, wherein said control processor further comprises at least a control terminal for electrically connecting with a pump of said power saw machine as one of accessory devices thereof, wherein said control processor is arranged for selectively activating said pump between a manual mode that said pump is automatically activated once said power saw machine is powered on and a semi-auto mode that said pump is set at stand-by once said power saw machine is powered on so as to enable said pump being automatically operated during cutting operation of said power saw machine, wherein when no load is detected, said control processor is arranged for shutting off said pump after said pump is running for a predetermined time period.

8. The electrical power diagnostic system, as recited in claim 6, wherein said control processor further comprises at least a control terminal for electrically connecting with a pump of said power saw machine as one of accessory devices thereof, wherein said control processor is arranged for selectively activating said pump between a manual mode that said pump is automatically activated once said power saw machine is powered on and a semi-auto mode that said pump is set at stand-by once said power saw machine is powered on so as to enable said pump being automatically operated during cutting operation of said power saw machine, wherein when no load is detected, said control processor is arranged for shutting off said pump after said pump is running for a predetermined time period.

9. The electrical power diagnostic system, as recited in claim 6, wherein said user interface comprises a display screen having a display indicator region and defining a low current section designated to indicate said current at said low current range, an optimal current section designated to indicate said current at said optimal current range, and a high current section designated to indicate said current at said high current range.

10. The electrical power diagnostic system, as recited in claim 8, wherein said user interface comprises a display screen having a display indicator region and defining a low current section designated to indicate said current at said low current range, an optimal current section designated to indicate said current at said optimal current range, and a high current section designated to indicate said current at said high current range.

11. The electrical power diagnostic system, as recited in claim 8, wherein said power saw management system further comprises a condition recordation module communicatively linked to said control processor for recording an operation condition of said power saw machine, wherein said condition recordation module contains data of indicating said abnormal operating condition of said power saw machine for enabling problem of said power saw machine being traced.

12. The electrical power diagnostic system, as recited in claim 10, wherein said power saw management system further comprises a condition recordation module communicatively linked to said control processor for recording an operation condition of said power saw machine, wherein said condition recordation module contains data of indicating said abnormal operating condition of said power saw machine for enabling problem of said power saw machine being traced.

13. The electrical power diagnostic system, as recited in claim 10, further comprising a system housing comprising a control panel for electrically connecting with said power unit of said power saw machine and for allowing a user to adjust operational parameters of said power saw machine, wherein said power saw management system is received in said system housing while said user interface is provided on said system housing to form an add-on device for connecting to said power saw machine.

14. The electrical power diagnostic system, as recited in claim 12, further comprising a system housing comprising a control panel for electrically connecting with said power unit of said power saw machine and for allowing a user to adjust operational parameters of said power saw machine, wherein said power saw management system is received in said system housing while said user interface is provided on said system housing to form an add-on device for connecting to said power saw machine.

15. The electrical power diagnostic system, as recited in claim 10, wherein said control processor comprises a power activation module electrically communicated with an on-off circuit of said power saw machine for selectively activating and deactivating said power saw machine.

16. The electrical power diagnostic system, as recited in claim 14, wherein said control processor comprises a power activation module electrically communicated with an on-off circuit of said power saw machine for selectively activating and deactivating said power saw machine.

17. An electrical power diagnostic system for a power saw machine having a saw blade driven by a power unit, comprising:
 a power saw management system, which is arranged for detecting an abnormal operating condition of said power saw machine, comprising a control processor for electrically communicating with said power saw machine to manage operational parameters of said power saw machine and to supervise actual operation of said power saw machine, wherein said control processor comprises a current detection module for detecting an electrical current drawn by said power unit in a real time manner in responsive to a load of said saw blade during cutting operation, wherein said current is detected by said current detection module among a low current range for indicating an under load of said saw blade, an optimal current range for indicating an optimal load of said saw blade, and a high current range for indicating an over load of said saw blade, wherein when said current detection module detects said power saw machine at said low current range or at said high current range, said control processor is adapted to selectively notify said operational parameters of said power saw machine for stopping said abnormal operating condition from continuously happening in order to ensure operation effectiveness and efficiency of said power saw machine while maintaining the maximum safety standard thereof; and
 a user interface electrically connected with said power saw management system for promptly and accurately communicating information from said power saw management system to a user of said power saw machine;
 wherein said control processor further comprises at least a control terminal for electrically connecting with a pump of said power saw machine as one of accessory devices thereof, wherein said control processor is arranged for selectively activating said pump between a manual mode that said pump is automatically activated once said power saw machine is powered on and a semi-auto mode that said pump is set at stand-by once said power saw machine is powered on so as to enable said pump being automatically operated during cutting operation of said power saw machine, wherein when no load is detected, said control processor is arranged for shutting off said pump after said pump is running for a predetermined time period.

18. An electrical power diagnostic system for a power saw machine having a saw blade driven by a power unit, comprising:
 a power saw management system, which is arranged for detecting an abnormal operating condition of said power saw machine, comprising a control processor for electrically communicating with said power saw machine to manage operational parameters of said power saw machine and to supervise actual operation of said power saw machine, wherein said control processor comprises a current detection module for detecting an electrical current drawn by said power unit in a real time manner in responsive to a load of said saw blade during cutting operation, wherein said current is detected by said current detection module among a low current range for indicating an under load of said saw blade, an optimal current range for indicating an optimal load of said saw blade, and a high current range for indicating an over load of said saw blade, wherein when said current detection module detects said power saw machine at said low current range or at said high current range, said control processor is adapted to selectively notify said operational parameters of said power saw machine for stopping said abnormal operating condition from continuously happening in order to ensure operation effectiveness and efficiency of said power saw machine while maintaining the maximum safety standard thereof; and
 a user interface electrically connected with said power saw management system for promptly and accurately communicating information from said power saw management system to a user of said power saw machine;
 wherein said control processor comprises a power activation module electrically communicated with an on-off circuit of said power saw machine for selectively activating and deactivating said power saw machine.

* * * * *